Sept. 20, 1927.

F. G. HULME

1,643,211

BULLION FRINGE LOOM

Filed May 14, 1925

Inventor-
Frederic G. Hulme.
by his Attorneys.
Howson + Howson

Sept. 20, 1927.  F. G. HULME  1,643,211
BULLION FRINGE LOOM
Filed May 14, 1925  6 Sheets-Sheet 5

Inventor:
Frederic G. Hulme,
by his Attorneys
Howson + Howson

Patented Sept. 20, 1927.

1,643,211

UNITED STATES PATENT OFFICE.

FREDERIC G. HULME, OF PHILADELPHIA, PENNSYLVANIA, ASSIGNOR TO HENSEL SILK MANUFACTURING COMPANY, OF PHILADELPHIA, PENNSYLVANIA, A CORPORATION OF PENNSYLVANIA.

BULLION FRINGE LOOM.

Application filed May 14, 1925. Serial No. 30,175.

The object of my invention is to provide a bullion fringe loom, of improved construction, which will be capable of a production practically double that of machines in general use at the present time, floor space required and all other conditions being equal in making such a comparison of produced results.

I obtain the above mentioned increase in production, mainly, by increasing the number of bullion hooks on a lay of given length, such increase being possible by the use of a special arrangement of these hooks, wherein I mount a series of hooks in a certain horizontal plane and an additional series of hooks in a horizontal plane removed from that of the first series. Such an arrangement of hooks permits their paths of reciprocal movement to overlap which conserves space longitudinally of the lay.

A contributory cause of the increased production resides in the fact that I am able to increase the number of oscillations, per minute, of the lay of my improved loom, due to the minimizing of the number of hook controlling elements necessarily reciprocal with respect to the lay; to the repositioning of certain of the hook operating elements, from the lay to a location remote with respect thereto; and to the improved form of lay motion employed.

As to the effecting of the contributory cause, first, I reciprocate only the hooks and a pair of slide bars, of light weight material, to which the hooks are operatively secured.

Second: I provide cam motions, remotely situated, for operating the hooks and their cooperating elements.

Third: The provision of a motion, constantly rotating, which oscillates the lay in a manner whereby the lay attains its maximum speed at the centre of each stroke of such oscillation; and therefrom, as the lay approaches the limits of motion of these strokes, the speed of movement of the lay is increasingly retarded from said maximum to a minimum obtained at the extreme end of the stroke. As the lay reverses its direction of movement the speed thereof is progressively accelerated from the minimum to the maximum attained at the centre of the stroke, as above mentioned. This uneven oscillation of the lay permits the hooks to be advanced and retrieved, with a consequent drawing of the bullion threads through the open binder warp sheds when the lay is "back;" and also permits the twisting of said bullion threads immediately preceding the "beat up" of the lay.

This continuous rotation of the elements of my improved lay motion eliminates the loss of time and reduction of speed common to the ordinary "dwell motion," wherein the dwell levers must be stopped and started, at the proper time, with a consequent vibrating and jerky operation of the loom.

Many advantages of a constructional nature will be apparent as hereafter described in the following specification and illustrated in the accompanying drawings, wherein

Figs. 2 and 3 constitute a longitudinal sectional elevation of the lay of a bullion fringe loom being taken on a line 2—3, Fig. 1;

Figures 1, 16:
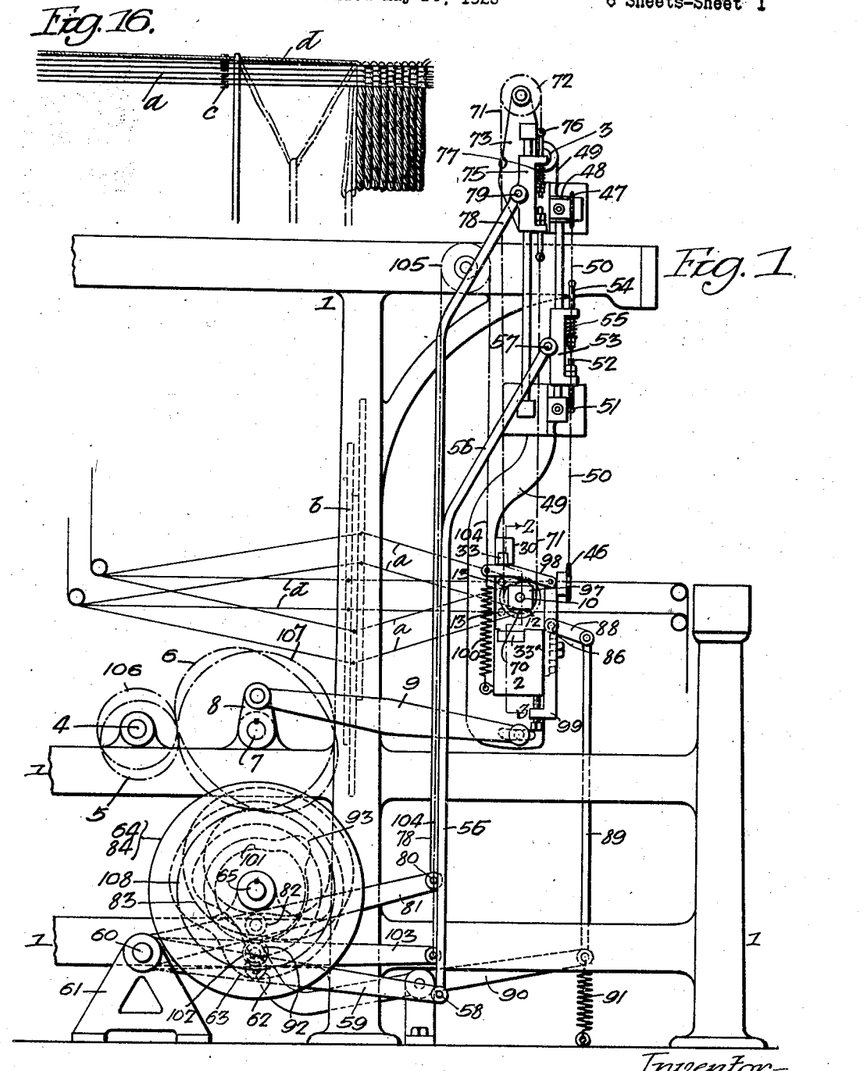
Fig. 1 is an end elevation of a bullion fringe loom comprising my invention, the illustration being of a more or less diagrammatic form.
Fig. 16 is a diagrammatic view illustrating the steps in hooking the bullion warp, and drawing the loop to form the twisted bullion fringe.

Referring to Fig. 1, 1 is the frame of a bullion fringe loom, having a lay 2 pivoted at 3 to said frame. Rotatably mounted in said frame and driven from any suitable source of power (not shown) is a main shaft 4, on which is secured an eccentric pinion gear 5 which meshes with an elliptical gear wheel 6 secured to a longitudinally extending crank shaft 7, suitably journaled in the frame of the loom. The crank shaft 7 is provided with crank arms 8 connected by rods 9 with the lay 2 of the loom, for the purpose of oscillating said lay to "beat up" each twisted bullion loop after it has been draw through the open binder warp shed.

A twister shaft 10 is rotatably mounted in bearings 11 secured to the lay 2, said shaft 10 extending longitudinally of said lay and having secured at intervals throughout its length gear wheels 12.

Meshing with each of the gear wheels 12 is a pinion gear 13 integral with and adjacent one end of a sleeve 14, rotatably mounted in a bearing 15 and having a flange 16 adjacent its end opposite the pinion gear 13.

Each of the sleeves 14 is provided with an axial bore 17 through which projects the squared shank 18 of a bullion hook 19.

Secured to each of the flanges 16, of the sleeves 14, is a key plate 20 which has a squared aperture 21 therein axially aligned with the bore 17 of said sleeve and serves to force rotation of the hook 19 with said sleeve and at the same time permit axial reciprocation of the shank 18 of said hook with respect to said sleeve.

The ends of the shanks 18 opposite the hooks 19 are adapted to pass through axial bores 22 of flanged sleeves 23 rotatably mounted in bearings or standards 24. The shanks 18 are adjustable with respect to the sleeves 23 and are secured in their adjusted positions by set screws 25 adapted to one of the flanges on each of said sleeves, as shown in Fig. 3.

It will be noticed upon reference to Fig. 3 that alternate hooks are mounted in different horizontal planes and the paths of movement of adjacent hooks are thereby permitted to overlap.

The bearing 15 of each of the upper hooks is formed as an integral part of the adjacent bearing 11 which supports the twister shaft 10, while the bearing of each of the lower hooks, which I shall designate as 15ª, is a separate bearing unto itself and is secured to the lay 2.

Likewise the standards at the free ends of the hook shanks 18 are alternately disposed in different horizontal planes with respect to each other, those of the upper plane being designated by the reference character 24 and those in the lower plane by the reference character 24ª.

A rail 30 is mounted above the lay 2 and adjacent one side thereof, as shown in Fig. 1, being rigidly secured at intervals throughout its length to said lay by supports 31.

Grooves 32ª and 32 are provided in the lay 2 and rail 31 respectively, whose centre lines are vertically aligned with each other and with the rotational centres of the hooks 19. Slide bars 33, 33ª are adapted to the said grooves 32, 32ª. The bearing brackets 24, 24ª are secured to the slide bars 33, 33ª.

A cross head 34 is provided at one end of the lay 2 and the slide bars 33, 33ª are secured to said cross head, for the purpose of providing means through which the said slide bars may be reciprocated simultaneously.

The cross head 34 is provided with a vertically disposed slot 35 adapted to operatively receive a roller 36 rotatably mounted on a crank pin 37, which projects from one end of an adjustable element 38, adapted to a groove 39 in a crank arm 40 secured to one end of an oscillating shaft 41. The adjustable element 38 is secured in its adjusted position on the crank arm 40 by a bolt 42, said adjustable element 38 being provided with a slot 43 for the accommodation of said bolt.

The shaft 41 is suitably mounted in a bearing 45 secured to the lay 2 and is provided, at its end opposite the crank arm 40, with a sprocket wheel 46.

Figures 11, 12, 13, 14, 15:
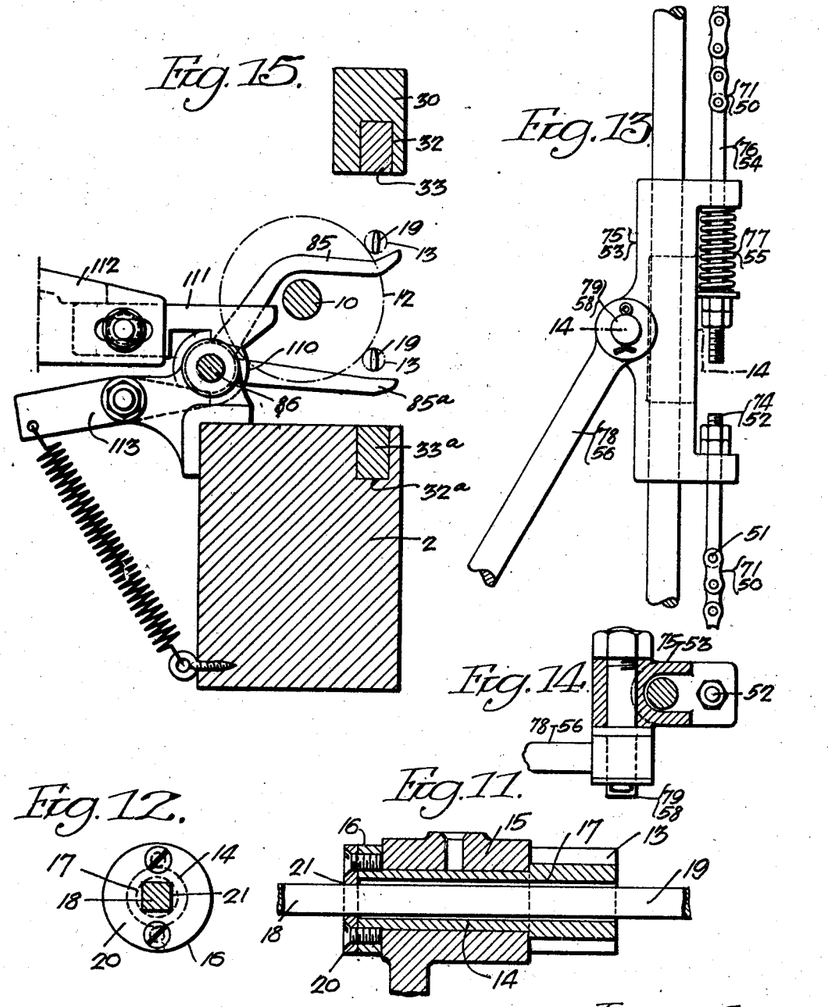
Figs. 11 and 12 are respectively a longitudinal sectional elevation and an end elevation of one of the hook revolving elements.
Figs. 13 and 14 are respectively a side elevation and sectional plan view of a detail of the invention.
Fig. 15 is a view of a modified form of stripper mechanism.

Adapted to the sprocket wheel 46 and to a sprocket wheel 47, which is rotatably mounted on a bracket 48 extending laterally from one of the supporting arms 49 of the lay 2, is a link belt 50, one end of which is secured at 51 to an eye bolt 52 adapted to one end of a connecting head 53. The opposite end of the chain 50 is secured to an eye bolt 54 resiliently mounted in the opposite end of said head 53, a spring 55 being interposed therebetween, as shown in Figs. 1 and 13.

A rod 56 having one of its ends pivoted to the connecting head 53, as at 57, has its opposite end pivoted at 58 to the outer end of a lever 59 which is pivoted at 60 to a bracket 61, as shown in Fig. 1.

The lever 59 has a roller 62 rotatably mounted intermediate its ends and adapted to a groove 63 in a cam 64 secured to a shaft 65 rotatably mounted in the frame of the loom.

Rotation of the cam shaft 65 and cam 64 produces a vertical reciprocation of the rod 56, which through the medium of the link belt 50 causes an oscillation of the shaft 41. Oscillation of the shaft 41 through its associated crank arm 40 and the cross head 34 causes the slide bars 33, 33ª and consequently the hooks 19 to be reciprocated longitudinally of the lay 2.

Rotation of the hooks 19, by which the bullion warp threads are twisted, is produced by turning the twister shaft 10. As above described, the hooks 19 are splined to the sleeves 14 and are turned thereby, the pinion gears 13 thereon meshing with the gear wheels 12 secured to the shaft 10.

The shaft 10 has secured thereon a ratchet wheel 66 adapted to be engaged by a pawl 67 pivotally mounted on a pawl carrier 68, which is loosely mounted on the shaft 10. A spring 69 is provided for the purpose of resiliently retaining the pawl 67 in contact with the ratchet wheel 66.

A sprocket wheel 70 is secured to the hub of the pawl carrier 68. A link belt 71 is adapted to the sprocket wheel 70 and to a sprocket wheel 72, which is rotatably mounted on a bracket 73 secured to the supporting arm 49 of the lay 2. One end of the link belt 71 is secured to an eye bolt 74 which is positioned in the lower end of a connecting head 75. The opposite end of the link belt 71 is secured to an eye bolt 76 resiliently mounted in the opposite end of the connecting head 75, a spring 77 being interposed therebetween, as shown in Figs. 1 and 13.

A rod 78 having one of its ends pivoted to the connecting head 75, as at 79, has its opposite end pivoted at 80 to the outer end of a lever 81, which is pivoted at 60 to the bracket 61, as shown in Fig. 1.

The lever 81 has a roller 82 rotatably mounted thereon, intermediate its ends, and adapted to a cam groove 83 of a cam 84 secured to the cam shaft 65.

Rotation of the cam 85 causes a vertical reciprocation of the rod 78, which through the medium of the link belt 71, sprocket wheel 70, pawl carrier 68, pawl 67 and ratchet wheel 66 causes a rotation of the shaft 10 in such a direction as to twist the bullion warp thread as illustrated in Fig. 16, through and by the rotation of the hooks 19.

Figure 8:
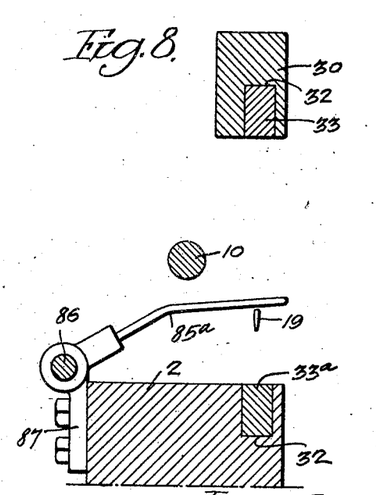
Figure 9:
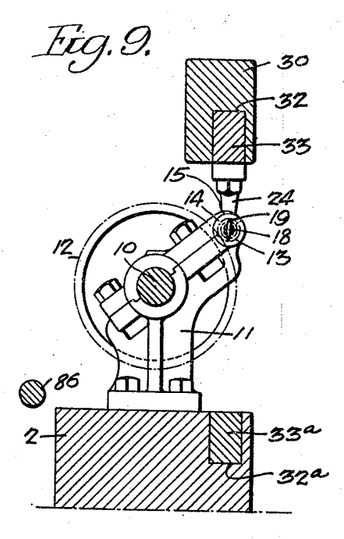
Figure 10:
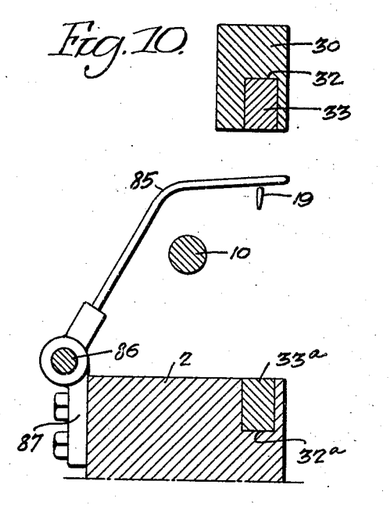

At this point of the operation it is necessary to strip the twisted bullion from the hooks 19, and for this purpose I provide stripper arms 85, 85ᵃ (see Figs. 3, 8 and 10).

The stripper arms 85, 85ᵃ are secured to a longitudinally extending rock shaft 86, which is pivotally mounted in bearings 87 secured to the lay beam 2. The rock shaft 86 has secured adjacent one of its ends a lever 88 (Fig. 1) connected by a rod 89 to one end of a lever 90 which is pivoted to a fixed bracket intermediate the ends of said lever. The opposite end of the lever 90 has rotatably mounted thereon a roller 92 for engagement with a cam 93 secured to the cam shaft 65.

A spring 91 (Fig. 1) tends to maintain the roller 92 in engagement with the cam 93 and the stripping fingers 85, 85ᵃ in their inoperative positions.

Rotation of the cam 93 causes a rocking motion of the shaft 86 and a consequent engagement of the stripper arms 85, 85ᵃ with the twisted bullion warp threads, by which the said bullion warp threads are forced off the hooks 19.

Figure 5:
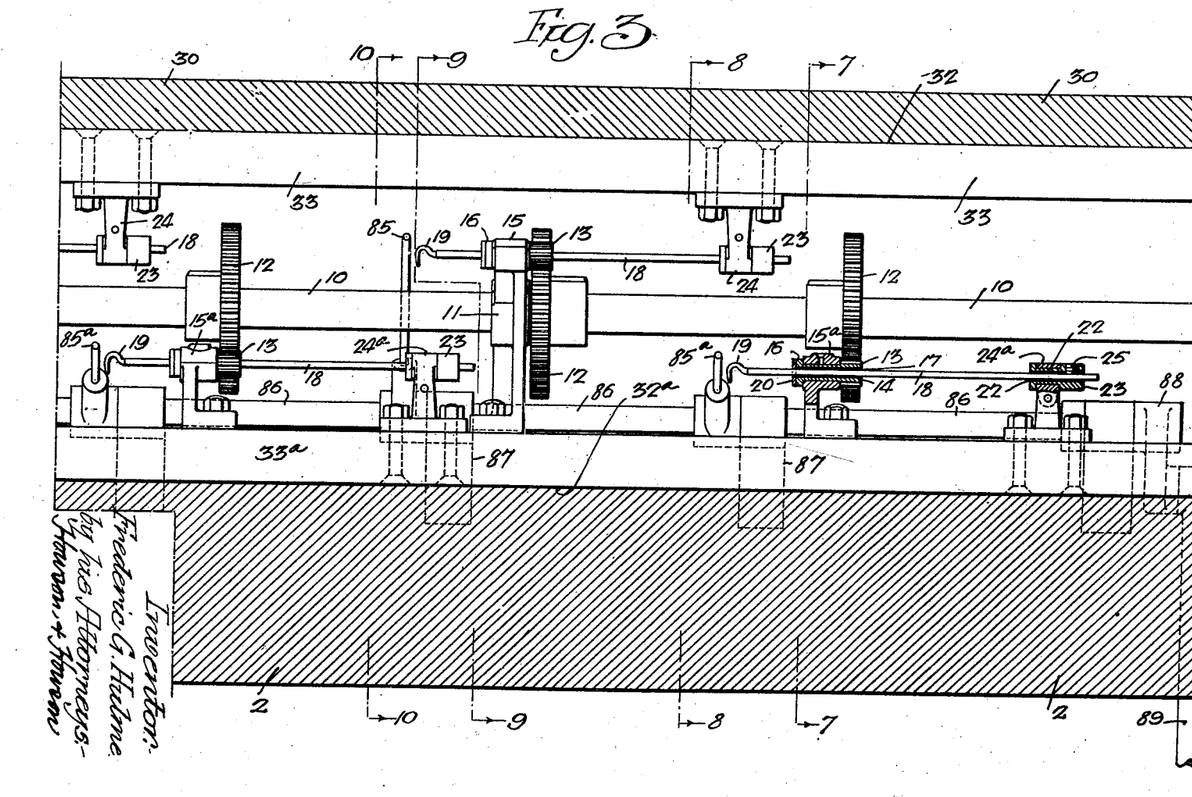
Figs. 5 and 6 are transverse sectional elevations taken on the lines 5—5 and 6—6, respectively, Fig. 2.

To make the above described stripping operation possible the hooks must come to rest at the end of their twisting operation with their points extending downward, in the present instance. To insure such a position of the points of the hooks 19, the link belt 71 is provided with a laterally extending bracket 94 (Fig. 5) adapted to engage the upper end of an adjustable limit stop 95, in this instance said limit stop comprising a threaded stud adapted to a bracket 96 secured to the lay beam 2.

Any additional downward movement of the link belt 71, after the above described engagement between the bracket 94 and the limit stop 95 takes place, is absorbed by the spring 77 of the connecting head 75.

Figure 2:
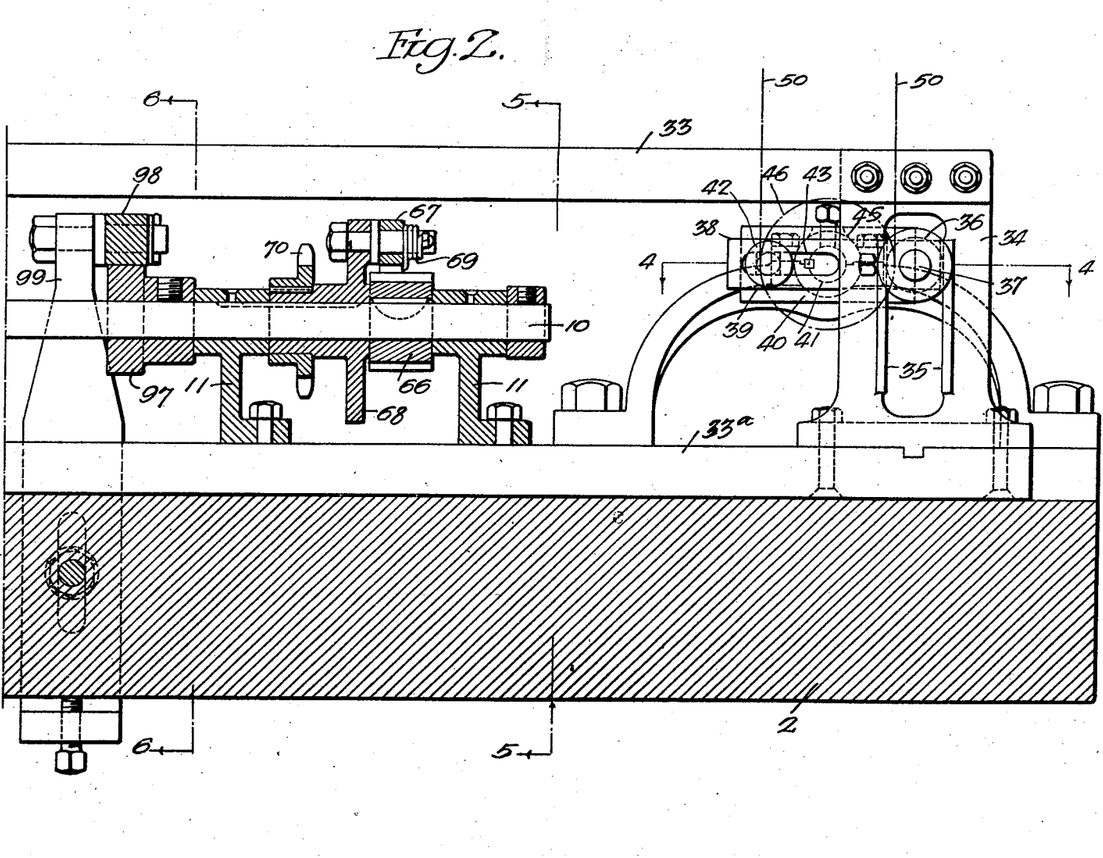
Figure 4:
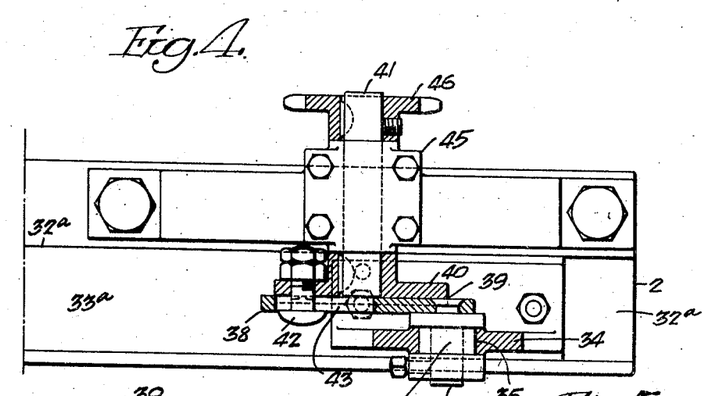
Fig. 4 is a sectional plan view taken on the line 4—4, Fig. 2.
Figure 6:
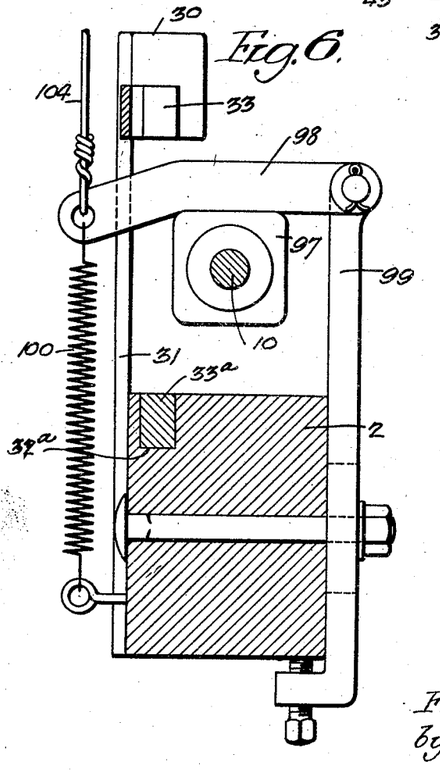
Figure 7:
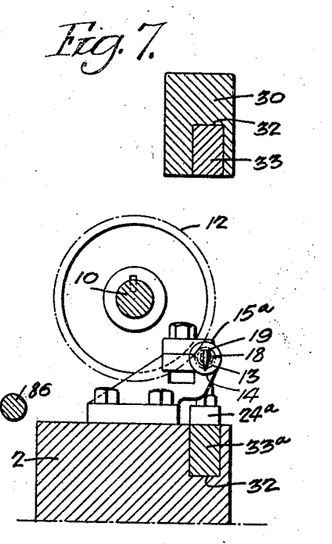
Figs. 7, 8, 9 and 10 are transverse sectional elevations taken on the lines 7—7, 8—8, 9—9 and 10—10, respectively, Fig. 3.

It is necessary to lock the twister shaft 10 against accidentally rotating the hooks 19 when the twisting operation is not in progress, to avoid fouling of the previously twisted bullion, and to permit the return of the link belt 71 and its associated elements to their normal positions, and to accomplish this end the twister shaft 10 has secured thereon a flat faced wheel 97 (Figs. 1, 2 and 6).

The flat faced wheel 97 is adapted to be engaged by a locking lever 98 pivoted to a bracket 99 which is secured to the lay beam 2. A spring 100, having one of its ends secured to the lay beam 2 and its opposite end secured to the locking lever 98, is provided for the purpose of retaining the shaft 10 in a quiescent state.

Operation of the locking lever 98, into and out of engagement with the flat faced wheel 97 is controlled by a cam 101 secured to the cam shaft 65 and engaging a cam roller 102, which is rotatably mounted on a lever 103 intermediate the ends thereof.

One end of the lever 103 is pivoted at 60 to the bracket 61, the opposite end of said lever having secured thereto one end of a link belt or other flexible connector 104, the opposite end of said flexible connector being secured to the free end of the locking lever 98. The flexible connector passes around a sheave or sprocket wheel 105 rotatably mounted on the frame 1 of the loom.

Rotation of the cam shaft 65, in the present instance, is produced by a pinion gear 106 secured to the main operating shaft 4, said pinion gear 106 meshing with an intermediate gear wheel 107 loosely mounted on the crank shaft 7 and in turn meshing with a gear wheel 108 secured to the cam shaft 65.

By means of the gearing shown in Fig. 1, the cam shaft 65 receives a constant and even rotation while the lay beam is given an uneven travel in so far as it dwells at each end of its oscillatory motion.

It will be understood that the usual jacquard mechanism may be and actually is associated with the loom for producing various designs on the fringe being woven, this however forms no part of the present invention and therefore has been omitted from the drawings and the description thereof.

In operation the loom is provided with the usual binding warp threads $a$ (Figs. 1 and 16) which pass from spools, (not shown) through heddle frames *b* (Fig. 1) and the usual reed *c* secured to the lay beam 2.

Bullion warp threads *d* pass from spools (not shown) through one of the heddle frames *b* and the reed *c* immediately adjacent the binder warp threads *a*.

Considering the lay beam back and the short radii of the pinion gear 5 in mesh with the long radii of the elliptical gear wheel 6 which produces a dwell in the oscillation of said lay beam at this point of its oscillatory motion, the cam shaft 65 rotating at a uniform speed causes the cam 64 to operate the oscillating shaft 41, through the intervening train of operating elements. Oscillation of the shaft 41 causes the hooks 19 to enter the said open binder warp shed to a position overlying the bullion warp threads *d*.

The bullion warp threads *d* are raised into engagement with the hooks 19, by one of the heddle frames *b*. The hooks 19 are then withdrawn through and from the open binder warp shed carrying with them the engaged bullion warp threads, drawing the same into the form of loops.

The binder warp shed now changes and the lay moves forward to "beat up" the bullion warp threads which, in their looped form, become the weft threads of the fabric.

The lay as it approaches the extreme "beat up" position slows up or dwells in its travel, at which time the cams 84 and 101 become effective. The cam 101 acts to raise the locking lever 98 from the flat faced wheel 97, while the cam 84, through the train of operative elements, acts to turn the shaft 10 and the hooks 19, for the purpose of twisting the bullion threads into their final state of perfection, after which the lay completes its "beat up" stroke to bind said twisted bullion threads rigidly in their twisted state. The cam 101 now acts to permit the lever 98 to again engage the flat faced wheel 97 for the purpose of retaining the shaft 10 in a quiescent state. The cam 93, through its train of associated elements, now acts to effect the stripping of the twisted bullion from the hooks 19, by the stripping fingers 85, 85ᵃ.

The long radii of the eccentric pinion gear 5 are now in mesh with the short radii of the elliptical gear 6 with a consequent increase in the speed of movement of the lay beam 2, intermediate the extreme positions of its oscillation. The lay now approaches its extreme back position and the other elements have been returned to their normal positions for the purpose of repeating the cycle of operation above described.

In Fig. 15 I have shown a modified form of stripping finger and apparatus for operating the same which includes a ratchet wheel 110 secured to the stripping rock shaft 86. In this instance the hooks 19 are stopped with their points upward, the stripping fingers 85, 85ᵃ engaging the twisted bullion from the underside. A pawl 111 is adjustably pivoted to a fixed portion 112 of the loom, and engages the ratchet wheel 110, as shown. A spring controlled lever 113 pivoted to the lay beam 2 also engages the ratchet wheel 110 in the manner illustrated and for the purpose of maintaining the shaft 86 and the stripping fingers in their normal positions.

As shown in Fig. 15 the lay beam 2 is in its extreme "beat up" position. As the said lay beam is moved from the illustrated position the shaft 86 will be rocked and the stripping fingers will be moved upwardly at their outer ends, with a consequent stripping of the twisted bullion from the hooks 19, due to the cooperative action of the pawl 111 and the ratchet wheel 110. Continued movement of the lay causes further rotation of the shaft 86 and a consequent forcing of the pawl 111 from engagement with the ratchet wheel 110 whereafter the lever 113 acts to return the elements to and maintain them in their normal positions until the lay again moves to its "beat up" position, wherein the pawl 111 again engages the ratchet wheel 110 for a repeat of the above described cycle of operations.

From the above description it will be apparent that I reduce the number of reciprocating elements on the lay beam to a minimum which permits of an increase in the number of oscillations per minute of the lay beam with a consequent increase in the production of the loom.

I further increase and actually double the production of a loom of given length, through the alternate high and low hooks which permits of the overlapping of their paths of travel. This feature has become known to the trade as a "double deck" bullion loom.

By introducing the eccentric and elliptical gearing into the lay motion of a fringe loom I provide a dwell in the oscillation of the lay beam which permits of the inserting and withdrawing of the hooks into and from the open binder warp shed and the twisting of the bullion without actually stopping the said lay, such a feature eliminating the undesirable stopping and starting vibratory reaction in the loom and permitting the loom to be operated by less power than is necessary at the present time.

I further increase the operating efficiency of the loom by placing the operating cam motions at one end of the loom, the cams thereof being located near the floor, where the elements of said motions may be conveniently adjusted and properly cared for.

It is obvious that my invention is capable of considerable modification without departing from the essential features thereof. I therefore do not intend that the invention shall be limited to the construction shown in the drawings and described in the above specification.

I claim:

1. The combination in a bullion fringe loom of a lay; bullion hooks rotatably and reciprocally mounted on said lay; means, mounted on said lay, for rotating said hooks; means, mounted on said lay, for reciprocating said hooks with respect to said rotating means and said lay.

2. The combination in a bullion fringe loom of a lay; and plural series of bullion hooks rotatably and reciprocally mounted on said lay, each series occupying a position and being operable in a plane removed from the plane occupied by the other series.

3. The combination in a bullion fringe loom of a lay; plural series of bullion hooks rotatably and reciprocally mounted on said lay and occupying positions in planes different from each other; means for rotating said bullion hooks in their respective planes; and means for reciprocating said hooks in their respective planes and in such a manner as to cause their respective paths of travel to overlap one with the other.

4. The combination in a fringe loom of a lay; bullion hooks on said lay; revoluble elements rotatably mounted on said lay; elongated shanks on said hooks, mounted in said revoluble elements and splined thereto, for the purpose of permitting axial reciprocation of said hook shanks with respect to said revoluble elements; means for rotating said revoluble elements and said hooks; and means for reciprocating said hooks with respect to said revoluble elements.

5. The combination in a fringe loom of a lay; hooks rotatably and reciprocally mounted on said lay; means for rotating said hooks; means for reciprocating said hooks; means for locking said hooks in certain definite positions, and stripping means associated with said hooks, all of which are mounted on said lay; and means, remotely situated with respect to said lay, connected to, and designed to control the actuation of, the above mentioned means mounted on said lay.

6. The combination in a fringe loom of a lay; bullion hooks rotatably and reciprocally mounted on said lay; means for rotating said hooks a definite number of revolutions in a definite direction; a limit stop included in said rotating means, whereby the angle assumed by the head of each of said hooks, when said hooks come to rest, may be accurately determined; and means for retaining the hooks in their assumed positions throughout the remainder of the cycle of operations of the lay.

7. The combination in a fringe loom of a lay; bullion hooks having open gullets rotatably and reciprocally mounted on said lay; means for rotating said hooks; means for stopping said rotation with the open gullets and the points of said hooks, collectively, in a certain definite and predetermined position; means on said lay for maintaining said hooks in said position throughout a portion of the cycle of operation of said hooks; and means for releasing said hooks during another portion of the said cycle of operation, remotely situated with respect to said lay.

8. The combination in a fringe loom of a frame; a constantly driven power shaft, rotatably mounted in said frame; a lay pivoted to said frame; a crank shaft rotatably mounted in said frame and operatively connected to said lay; an eccentric gear wheel secured to said power shaft; an elliptical gear wheel secured to said crank shaft and meshing with said eccentric gear wheel; bullion hooks operatively mounted on said lay; operating elements cooperating with said bullion hooks and mounted on said lay; a cam shaft rotatably mounted in said frame and geared to said power shaft; and means for operatively connecting said bullion hooks and the said cooperating elements to said cam shaft, whereby the operation of the lay, the bullion hooks and the cooperating elements may be properly timed one with the others.

9. The combination in a fringe loom of a lay; bearings mounted on said lay; sleeves rotatably mounted in said bearings; bullion hooks having elongated shanks mounted in and axially aligned with and splined to said sleeves; gear teeth on said sleeves; a longitudinally extending shaft, rotatably mounted in bearings on said lay; driving gears secured to said longitudinally extending shaft and meshing with the gear teeth on said sleeves; means for rotating said shaft and consequently said hooks; and means for reciprocating said hooks with respect to said rotating means.

10. The combination in a fringe loom of a lay; bullion hooks rotatably and reciprocally mounted on said lay; means for rotating said hooks, comprising a suitably mounted longitudinally extending shaft; a ratchet wheel secured to said shaft; a resilient pawl engaging said ratchet wheel and mounted on a pawl carrier which is loosely mounted on said shaft, adjacent said ratchet wheel; and means for rotating said pawl carrier, alternately, in clockwise and counter-clockwise directions, for the purpose of intermittently rotating said shaft in one of said directions; and means for reciprocating said hooks with respect to said shaft and said lay.

11. The combination in a fringe loom of a lay; bullion hooks rotatably mounted on said lay; a longitudinally extending shaft rotatably mounted on said lay and operatively connected to said hooks, pawl and ratchet mechanism on said shaft and including a pawl carrier; a sprocket wheel secured to said pawl carrier; a link belt adapted to said sprocket wheel and to an idler sprocket wheel suitably mounted on said loom; a connector head included in said link belt; a rod pivoted, at one of its ends to said connecting head, and pivoted at its opposite end to one end of a cam lever; a roller operatively connecting said cam and cam lever; and means for rotating said cam.

12. The combination in a fringe loom of a lay; plural series of hooks reciprocally and rotatably mounted on said lay; separate means for inter-connecting the hooks of each series; single means for simultaneously reciprocating all the series of hooks; and single means for synchronizing the rotation of all the hooks of all the series of hooks.

13. The combination in a fringe loom of a lay; a rail disposed above and adjacent the plane of one side of said lay; a groove in said rail; a groove in said lay; reciprocating bars adapted to said grooves; a cross head secured adjacent one end of each of said bars; standards secured to said bars; flanged sleeves rotatably mounted in said standards; bullion hooks, each having one end thereof adjustably secured in and axially aligned with each of the said flanged sleeves; means for reciprocating said bars and said hooks; and means for rotating said hooks.

14. The combination in a fringe loom of a lay; bullion hooks rotatably and reciprocally mounted on said lay; means for rotating said hooks; means for reciprocating said hooks and comprising a cross head having a vertically disposed slot therein; a crank pin adapted to said slot; a transversely extending oscillating shaft suitably mounted on said lay; an adjustable crank arm, secured to one end of said shaft, to which said crank pin is secured; a sprocket wheel secured adjacent the opposite end of said oscillating shaft; and means for oscillating said shaft, remotely situated with respect to said lay.

15. The combination in a fringe loom of a lay; bullion hooks rotatably and reciprocally mounted on said lay; means for rotating said hooks; means for reciprocating said hooks and comprising an oscillating and transversely mounted shaft; a sprocket wheel secured to said shaft; a link belt adapted to said sprocket and to an idler sprocket suitably mounted on said loom; a connector head included in said link belt; an operating cam remotely situated with respect to said lay; a cam lever operatively associated with said cam; a rod connecting said cam lever and said connector head; and means for operating said cam.

16. The combination in a fringe loom of a lay; bullion hooks on said lay; means for operating said bullion hooks including link belts; connector heads included within said link belts, one end of each of said link belts being rigidly secured to one end of each of said connector heads; the opposite end of said link belt being connected to a resiliently mounted eye bolt, slidably mounted in the opposite end of said connector head; and a spring, confined between the free end of said eye bolt and the adjacent end of said connector head.

17. The combination in a fringe loom of a lay; bullion hooks on said lay; means for reciprocating said hooks; means for rotating said hooks including a longitudinally extending shaft; means on said shaft for locking said hooks in a certain definite position including a wheel having a flat face, adjustably secured to said shaft; a locking lever engaging said flat face and being pivoted at one end to a bracket secured to said lay; a remotely situated cam; a cam lever operatively associated with said cam; a flexible connector between said cam lever and said locking lever; and a spring for normally retaining said locking lever in engagement with said flat sided wheel.

18. The combination in a fringe loom of a lay; bullion hooks reciprocally and rotatably mounted on said lay; means for reciprocating said hooks; a longitudinally extending shaft for rotating said hooks, rotatably mounted on said lay; a link belt for driving said shaft; a bracket secured to said link belt; and an adjustable limit stop secured to said lay for cooperative engagement with said link belt bracket.

FREDERIC G. HULME.